A. J. Knight,
Carpet Sweeper.
No. 105,223.  Patented July 12. 1870.
Fig: 1.
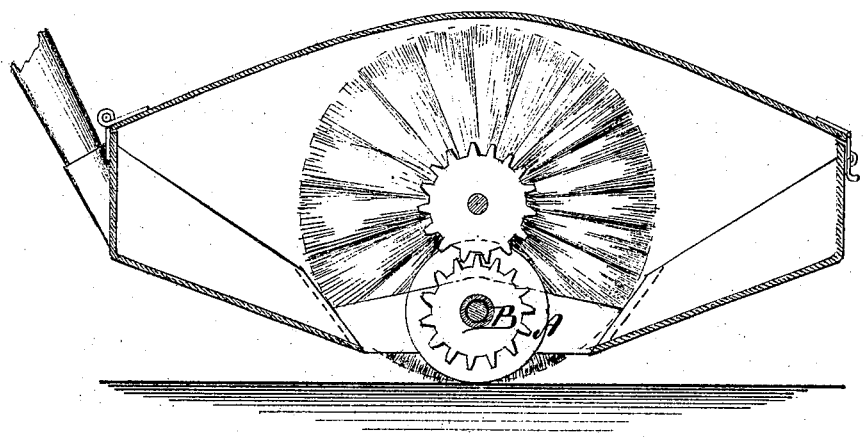
Fig: 2.
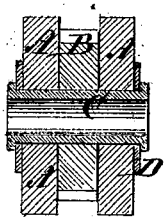

United States Patent Office.

ALFRED J. KNIGHT, OF BROOKLYN, NEW YORK.

Letters Patent No. 105,223, dated July 12, 1870.

IMPROVED DRIVING-GEAR WHEEL FOR CARPET-SWEEPERS.

The Schedule referred to in these Letters Patent and making part of the same.

*To all whom it may concern:*

Be it known that I, ALFRED J. KNIGHT, of Brooklyn, in the county of Kings and State of New York, have invented a new and useful Improvement in Driving-Wheels for Carpet-Sweepers; and I do hereby declare that the following is a full, clear, and exact description thereof, which will enable others skilled in the art to make and use the same, reference being had to the accompanying drawing forming part of this specification.

My invention relates to carpet-sweepers, and consists in an improved construction thereof, as will be hereinafter described.

Figure 1 is a transverse section of a carpet-sweeper with driving-wheels constructed according to my invention, and Figure 2 is a section of one of the wheels.

Similar letters of reference indicate corresponding parts.

A represents two circular disks of India rubber, and B a metal-toothed wheel, all clamped together by a tubular center, C, passing through the axis of the wheel, and riveted down at the ends on washers D. The toothed wheel B is not so large as the disks, and does not touch the floor or carpets.

I propose, also, to make these compound wheels by placing the metal parts in molds, and casting the India rubber around them, the molds being suitably shaped to prevent the spaces between the teeth from being filled.

It is necessary to use India rubber, or other substance which is noiseless, on these machines. It is also required to produce sufficient traction to work the brush, and, in some cases, wheels wholly made of India rubber have been used, but they are found to be defective in respect to the wear of the teeth, which soon fail. My improved wheel possesses all the requisite qualities, namely, durability of the teeth, traction of the working faces on the floor, and freedom from noise.

Having thus described my invention,

I claim as new and desire to secure by Letters Patent—

The rubber disks A A, spur-wheel B, and tube C, flanged at each end, combined with a carpet-sweeper, having its parts constructed and arranged as shown and described.

The above specification of my invention signed by me this 7th day of April, 1870.

ALFRED J. KNIGHT.

Witnesses:
GEO. W. MABEE,
L. S. MABEE.